United States Patent Office 3,128,195
Patented Apr. 7, 1964

3,128,195
METHOD OF MAKING LIMED TALL OIL
Anargiros P. Patellis, Clairton, Pa., assignor to Pennsylvania Industrial Chemical Corporation, Clairton, Pa., a corporation of Pennsylvania
No Drawing. Filed May 6, 1960, Ser. No. 27,269
6 Claims. (Cl. 106—123)

This invention relates to the production of limed tall oil of improved quality and utility as compared with the limed tall oils previously available.

Tall oil is a product of the sulfate process of producing wood pulp. It is recovered from the spent cooking liquor, or black liquor, as a black, viscous material. It consists, approximately, of 40 to 45 percent of rosin acids and 40 to 45 percent of fatty acids, with about 10 percent of unsaponifiable material, chiefly sterols.

The standard procedure in the preparation of tall oil for use, for example as a plasticizer in the making of mastic or asphalt tile, is to blend the tall oil with a mineral oil and then to disperse in the blended mixture hydrated lime to neutralize the acid content and produce a composition of the mineral oil and what may be referred to as calcium tallate. A common practice is to catalyze the reaction with, for instance, acetic acid. Experience has shown that limed tall oil produced in this way contains significant amounts of insoluble material, chiefly unreacted lime particles carrying on their surfaces the highly insoluble fully, or almost completely, neutralized calcium soap. Such insoluble lumps are undesirable in that they may cause plugging of the lines and settling in the tanks, and in heated zones carbonization of the residue may result. Furthermore, the unreacted lime may eventually work free from the insoluble material and react with unreacted rosin and fatty acids in the mixture with an increase in its melting point and a degree of instability, both of which are objectionable to the users of these materials.

It is among the objects of this invention to provide a method of making limed tall oil that is simple and easily practiced, makes use of the materials heretofore used for that purpose, and results in limed tall oil essentially free from the disadvantages of the prior practice described above.

The invention is predicated upon my surprising discovery that limed tall oil free, or substantially free, from insoluble matter is obtained by reversing the prior practice. In other words, in accordance with this invention the hydrated lime is first dispersed in the mineral oil and the tall oil is then added to the dispersion. Remarkably enough the lime is completely reacted in this way, and the product does not contain the insoluble matter, or sludge, that characterizes prior practice in which the lime is added to the blend of tall oil and mineral oil. This result was completely unexpected, and the reason why there is no formation of insoluble matter in the practice of this invention is unknown.

More in detail, in accordance with this invention the mineral oil is heated in a reaction kettle and while agitating it vigorously the hydrated lime is added together with a small amount of acetic acid or other catalyst. When a good dispersion has been produced the tall oil is added, most suitably at a rate such as to minimize foaming. The temperature is then raised and thief samples are taken at intervals and the softening points and acid numbers are determined. When these values level out satisfactorily complete reaction may be assumed. The product is clear with no insoluble lumps, and with no excess lime although a small excess of lime is not ordinarily detrimental.

In accordance with this invention there may be used, by weight, from about 30 to 50 percent of tall oil with from about 70 to 50 percent of mineral oil, with the preferred composition being made from a 50–50 mixture of the two. For some purposes the finished product should be around 60° to 80° C. softening point (ball and ring).

The mineral oil serves as a low cost plasticizer for the limed tall oil. It should be of the naphthenic type, of fairly high viscosity, and for most purposes of very good color. Oils that are satisfactory for the purposes of the invention are sometimes called process oils, some of which are used as softeners in rubber compounding. The oils preferred range in color from 10 to 15 on the Gardner scale, from 4 to 7 on the Hellige scale, and from 2 to 4 on the coal tar scale. The viscosity at 210° F. ranges from about 50 on the low side to 200 or more Saybolt universal seconds on the high side. The pour point ranges from about 0° to 30° F. The flash point may range from about 400° to 550° F., while the aniline point determined at 50 percent equal weight of the aniline and the oil will vary from about 70° C. to 100° C. Oils of other characteristics may be used, of course.

So-called chemical lime, which is hydrated burned limestone of high calcium content, is entirely satisfactory for the purposes of the invention. It should not contain any unslacked calcium oxide, and it should be relatively dry. During storage and prior to use it should be protected from atmospheric carbon dioxide which would form calcium carbonate that is not particularly reactive in this reaction.

The reaction proceeds slowly below about 150° C. although neutralization will occur at and below that temperature although at uneconomical rates. In general the maximum temperature during the reaction should not exceed about 220° C. because at higher temperatures darkening of the binder and even decomposition may occur. For most purposes it is preferred to complete the reaction at about 175° C.

Glacial acetic acid is preferred as the catalyst because of its solubility in the reaction mixture. Various other catalysts can be used, however, such as those disclosed in U.S. Patent 1,884,407 which has to do with rosin treatment; however, the catalysts of that patent are applicable in the present invention. Small amounts of catalyst suffice, as will be understood by workers in the art, the exact amount depending upon the particular catalyst used, but in general there is nothing critical in this feature although obviously for reasons of economy amounts in excess of those productive of satisfactory reaction are to be avoided.

In the preferred practice of the invention these steps are followed: (1) the mineral oil is charged to the reaction kettle, (2) the oil is heated to about 120° C., (3) vigorous agitation is initiated, and continued to the end of the process, while the hydrated lime is added, (4) the catalyst is added, (5) the tall oil is added gradually at a rate such as to minimize foaming, (6) the temperature is raised to 175° C., (7) the temperature is maintained until as complete a reaction as possible has occurred. This is determined in the manner indicated hereinabove.

The invention may be exemplified by the following examples in which the practice was as just described, with reference to parts by weight and softening points by the ball and ring method:

*Example A.*—This involved equal parts of crude tall oil and Atlantic 11 oil, with 11 percent of hydrated lime based on the tall oil. The product had a softening point of 62° C. and an acid number of 8.2.

*Example B.*—In this example there were used 49 percent of Sun XXX oil, 26 percent of crude tall oil, and 26 percent of tall oil pitch, with 10 percent of hydrated lime based on the sum of the tall oil and tall oil pitch.

The product has a softening point of 105° C. and an acid number of 8.2.

*Example C.*—This involved, by weight, 27 percent of crude tall oil, 23 percent of refined tall oil, and 50 percent of Sun XXX oil, with 11 percent of hydrated lime based on the total tall oil content. The softening point of the product was 69° C. and the acid number was 13.8.

Atlantic 11 oil has an aniline point of 90 to 95, Gardner color of 11, and Saybolt Universal viscosity of 100 to 120 seconds. Sun XXX oil has an aniline point of 85° C., Gardner color of 15, and Saybolt Universal viscosity at 210° F. of 190 seconds.

The limed tall oil is useful for the purpose to which this material is normally applied. Depending on the particular use, the softening point may be controlled by the amount of hydrated lime used. The more lime used the higher the softening point will be. The acid number is a measure of the amount of rosin acids and fatty acids left unneutralized. As the examples indicate, the softening point is variable over an appreciable range. When used with tile resins for the manufacture of mastic tile it is generally preferred to have softening point be about 80° C. A typical example of the use of the product of this invention in the making of such tile would be a composition of, by weight, 15 parts of Picco resin 420–T (a thermoplastic coumarone-indene resin of 95° to 105° C. melting point, and of 4 to 6 color on the coal tar resin scale) and 7 parts of limed tall oil made in accordance with this invention. Twenty-two parts of this blend are then incorporated with 78 parts of a blend of 58 parts of ground limestone, 40 parts of 7–R asbestos, and 2 parts of pigment. These materials are blended, sheeted, calendered, and cut to tile size in accordance with practice well established and understood in the tile trade.

All softening points stated herein were determined by the ASTM E–28 ring and ball softening point method.

According to the provisions of the patent statues, I have explained the principle of my invention and have described what I now consider to represent its best embodiment. However, I desire to have it understood that, within the scope of the appended claims, the invention may be practiced otherwise than as specifically described.

I claim:

1. That method of making limed tall oil comprising the steps of forming a dispersion of hydrated lime in a mineral oil at a temperature of at least about 120° C., adding tall oil to the vigorously agitated dispersion while raising the temperature to not over about 220° C., and continuing to agitate until reaction between the all oil and the lime has been completed.

2. A method according to claim 1, said mineral oil being of naphthenic character.

3. A method according to claim 1 in which there are used, by weight, about 30 to 50 percent of tall oil and from about 70 to 50 of mineral oil.

4. A method according to claim 3 in which said mineral oil is of naphthenic character, has a viscosity at 210° F. of about 50 to 200 Saybolt Universal seconds and an aniline point at equal parts by weight of aniline and the oil of about 70 to 100° C.

5. A method according to claim 1 in which said lime is used in an amount of about 11 percent by weight based on the tall oil.

6. That method of making limed tall oil comprising the steps of forming a dispersion of hydrated lime in a mineral oil of naphthenic character at a temperature of at least about 120° C., adding tall oil to the dispersion while vigorously agitating it and progressively raising the temperature to not over about 220° C., and continuing the agitation to complete reaction between the tall oil and the lime, there being used, by weight, about 70 to 50 percent of mineral oil and 30 to 50 percent of tall oil, and about 11 percent by weight of lime based on the tall oil.

References Cited in the file of this patent

UNITED STATES PATENTS

| | | |
|---|---|---|
| 2,367,462 | Farber | Jan. 16, 1945 |
| 3,416,676 | Bernardi et al. | Mar. 4, 1947 |
| 2,448,621 | Rice | Sept. 7, 1948 |
| 2,908,676 | Valkenburgh | Oct. 13, 1959 |

UNITED STATES PATENT OFFICE
CERTIFICATE OF CORRECTION

Patent No. 3,128,195                      April 7, 1964

Anargiros P. Patellis

It is hereby certified that error appears in the above numbered patent requiring correction and that the said Letters Patent should read as corrected below.

Column 2, line 69, for "49" read -- 48 --; column 3, line 13, for "purpose" read -- purposes --; column 4, line 9, for "all" read -- tall --.

Signed and sealed this 4th day of August 1964.

(SEAL)
Attest:

ERNEST W. SWIDER
Attesting Officer

EDWARD J. BRENNER
Commissioner of Patents